No. 801,633. PATENTED OCT. 10, 1905.
A. ARMITAGE & W. P. THISTLETHWAITE.
SPEED GEARING DEVICE FOR GRAIN DRILLS.
APPLICATION FILED APR. 24, 1905.
2 SHEETS—SHEET 1.
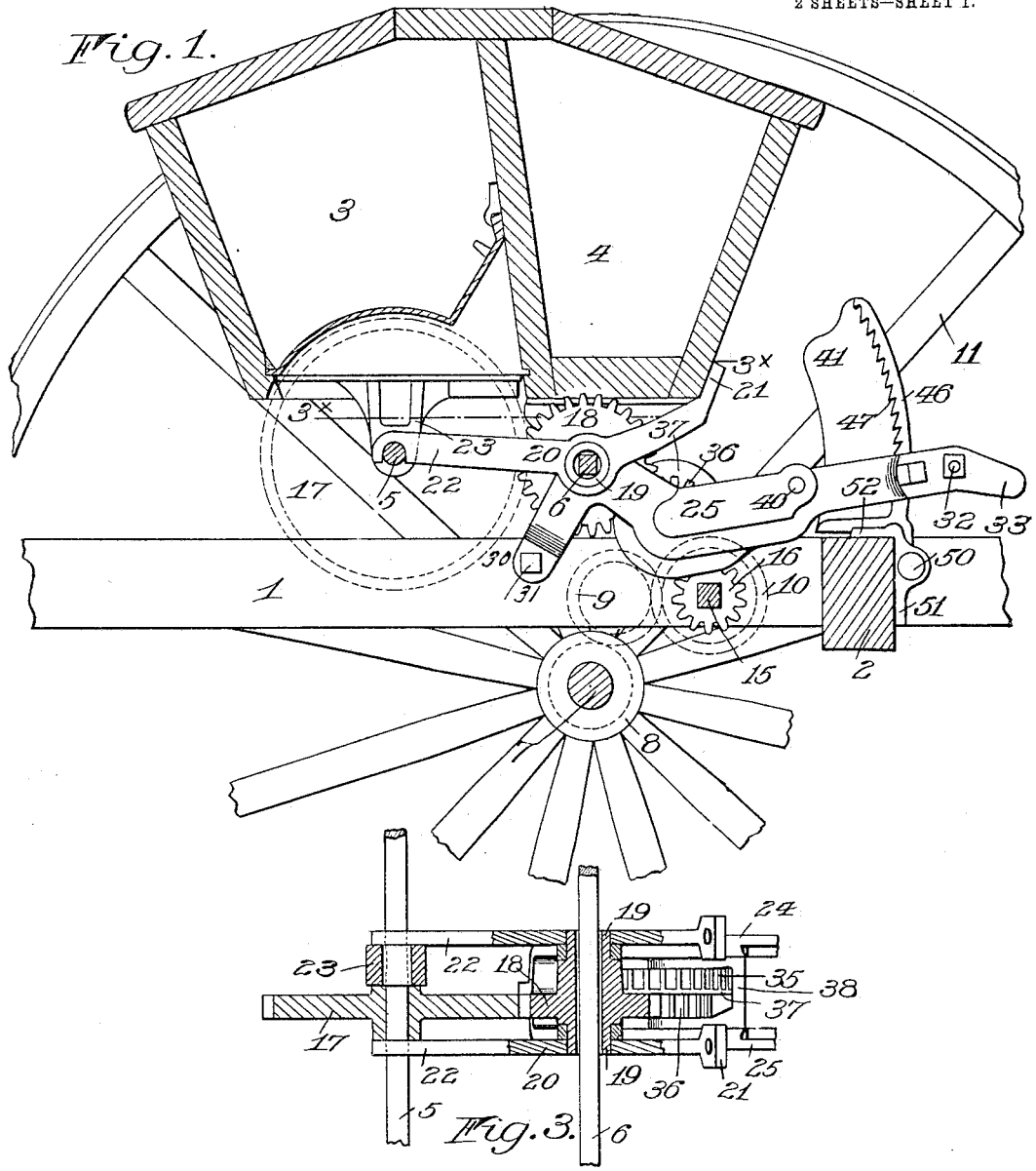

No. 801,633. PATENTED OCT. 10, 1905.
A. ARMITAGE & W. P. THISTLETHWAITE.
SPEED GEARING DEVICE FOR GRAIN DRILLS.
APPLICATION FILED APR. 24, 1905.
2 SHEETS—SHEET 2.
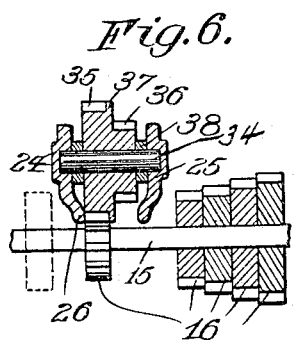
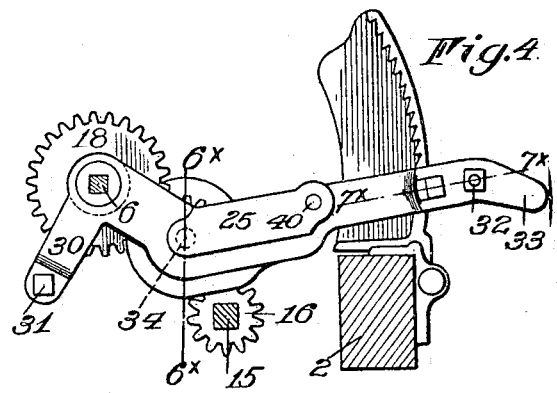
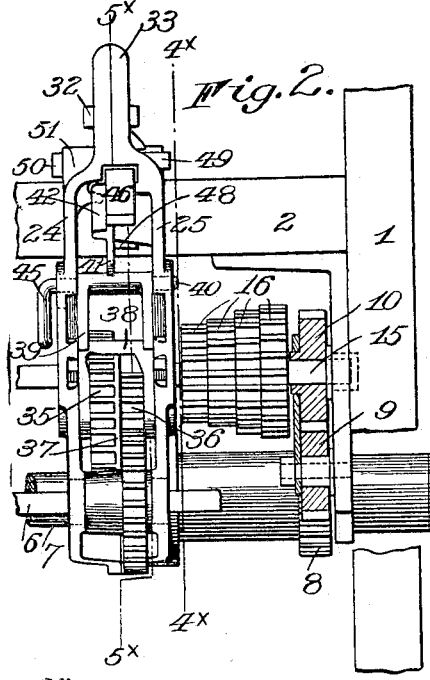
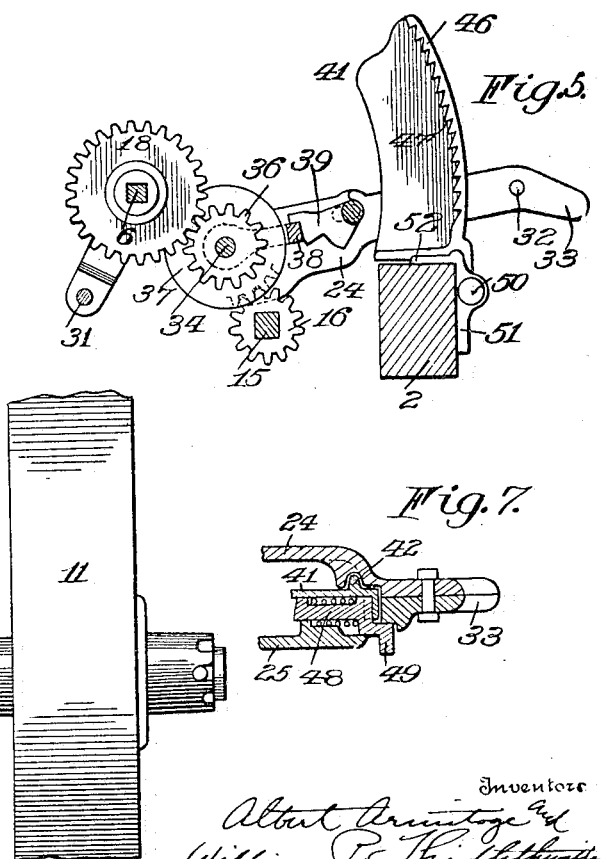

UNITED STATES PATENT OFFICE.

ALBERT ARMITAGE, OF FAIRPORT, AND WILLIAM P. THISTLETHWAITE, OF MACEDON, NEW YORK, ASSIGNORS TO ONTARIO DRILL COMPANY, OF DESPATCH, NEW YORK, A CORPORATION OF NEW YORK.

SPEED-GEARING DEVICE FOR GRAIN-DRILLS.

No. 801,633.     Specification of Letters Patent.     Patented Oct. 10, 1905.

Application filed April 24, 1905. Serial No. 257,054.

*To all whom it may concern:*

Be it known that we, ALBERT ARMITAGE, of Fairport, in the county of Monroe, and WILLIAM P. THISTLETHWAITE, of Macedon, in the county of Wayne, in the State of New York, have invented certain new and useful Improvements in Speed-Gearing Devices for Grain-Drills; and we do hereby declare the following to be a full, clear, and exact description of the same, reference being had to the accompanying drawings, forming a part of the specification, and to the reference-numerals marked thereon.

Our present invention has for its object to provide mechanism adapted to be employed upon grain-drills for connecting the driving shaft or axle with the driven shafts operating the seed and fertilizer distributing devices, whereby the relative speed of said devices may be varied.

To these and other ends the invention consists in certain improvements and combinations of parts, all as will be hereinafter more fully described, the novel features being pointed out in the claims at the end of the specification.

In the drawings, Figure 1 is a diagrammatic view showing the hopper of a grain-drill in longitudinal section and illustrating the application of devices embodying the invention applied thereto. Fig. 2 is a plan view of said devices. Fig. 3 is a similar view taken on the line $3^x 3^x$ of Fig. 1. Fig. 4 is a side elevation taken on the line $4^x 4^x$ of Fig. 2. Fig. 5 is a detail sectional view taken on the line $5^x 5^x$ of Fig. 2. Fig. 6 is a cross-sectional view taken on the line $6^x 6^x$ of Fig. 4, and Fig. 7 is a detail sectional view taken on the line $7^x 7^x$ of Fig. 4.

Similar reference-numerals in the several figures indicate similar parts.

In illustrating the invention only such parts of a grain-drill as are required to give a comprehensive understanding of its objects and purposes have been shown, and these parts comprise the machine-frame embodying a side piece 1 and a rear cross-bar 2, on which is mounted a hopper divided into chambers or compartments 3 and 4, adapted to contain the fertilizing material and the seed or grain, respectively, which is distributed by suitable mechanisms (not shown) located in the bottoms of the compartments. Extending longitudinally beneath the hopper are two driven shafts, the one for operating the fertilizer-distributing mechanism being indicated by 5 and located beneath the compartment 3, while the shaft for operating the seeding mechanism is indicated by 6. The frame of the grain-drill is supported on an axle 7, connected at its ends to the hubs of the vehicle-wheels, a fragment of one of which is shown and indicated by 8. As usual in agricultural implements of this class, the driven shafts 5 and 6 are operated by the rotary movement of the axle 7 when the vehicle is drawn in a forward direction, suitable driving connections being employed whereby the feeding mechanisms may be adjusted by the operator to distribute given quantities of fertilizer and seed. To this end the axle 7 is provided with a gear-wheel 8, which coöperates with an idler 9, supported on the side piece 1 of the frame, engaging a gear-wheel 10 on a driving-shaft 15, located above and in rear of the axle 7. This shaft is preferably angular in cross-section, and supported thereon is a plurality of gear-wheels 16 of different diameters, which are capable of longitudinal movement to enable one or another of them to be moved into operative position, as will be further described.

The shaft 5 is rotated by a gear-wheel 17, intermeshing with the idler gear-wheel 18, arranged in alinement therewith on the shaft 6, and as the latter shaft is usually angular in cross-section the hub of the idler gear-wheel 18 is provided with a circular recess permitting the shaft to revolve independently therein. At each side of the idler gear-wheel are provided extended hubs 19, which are journaled in brackets 20, secured to the hopper at 21 and provided with the ends 22, which embrace the shaft 5. Inasmuch as the latter is securely supported beneath the hopper in bearings 23 the ends of the brackets 20 may be conveniently hooked over the shaft 5, as shown, and being secured rigidly at their other extremities they will rigidly support the idler gear-wheel 18, and the latter will form a bearing carrying the shaft 6, in addition to the usual bearings, (not shown,) which depend from the bottom of the hopper. Also journaled on the hubs 19 of the idler gear-wheel 18 are arms 24 and 25, having their forward ends extending downwardly, as indicated at 30, and secured together by a bolt 31, while their opposite extremities are similarly united in rear of the cross-bar 2 by means of a bolt 32, forming a rearwardly-projecting handle 33. The central portion of the yoke extends downwardly over the driving-shaft 15, and at its lower side, extending into proximity with the shaft, are depending flanges 26, the inner edges of which are in alinement with the outer side faces of the pinions 35 and 36 and extend below the periphery of the gear-wheel on the shaft 15, coöperating therewith. In the proximate faces of the arms 24 and 25 are provided channels receiving the ends of a pin 34, on which is mounted the intermediate pinions 35 and 36, preferably formed in a single casting with a web 37 between them. These pinions being provided with different numbers of teeth, they may be alternately engaged with the idler 18 to produce different speeds thereof, and by connecting them either one of the pinions may be meshed with one of the differential gear-wheels 16, thus affording an increase in the number of speed adjustments which may be attained. Further, by providing the web 37 between them the operating gear-wheel on the shaft 15 is held in position between it and the flange 26, as shown in Fig. 6. It will also be noticed that these flanges prevent inoperative gear-wheels from passing beneath the yoke and accidentally interfering with the pinions thereon.

In order to permit the pinions 35 and 36 to be readily removed and arranged in alinement with the idler 18, the ends of the pin 34 are embraced by arms on a frame 38, which normally lie between the side pieces of the yoke and are held in position by a gate-piece 39, having shoulders or stops thereon engaging in rear of the frame 38 in its different positions of adjustment. The gate 39 is provided on one side with a pin or lug 40, journaled in an aperture in the side piece 25 of the yoke, and at its opposite side is a similar extension 45, the extremity of which projects forwardly of the pivotal point and is of sufficient weight to hold the gate in its normal or closed position, as shown in Fig. 5. The aperture through which the extension 45 passes in the side piece 24 of the yoke is elongated, as shown in dotted lines in Fig. 5, to permit the handle to be inserted therethrough, this being a simple arrangement of parts which facilitates their construction and the ease with which they can be assembled.

Owing to the different diameters of the pinions 35 and 36 and also the gear-wheels 16, the outer end of the yoke moves vertically in an arc described from the center of the shaft 6, and to guide it in this movement and to secure it in operative position to prevent accidental engagement of the pinions carried thereon from the gear-wheel with which they are coöperating a segmental locking-plate 41 is provided, extending upwardly on the cross-bar 2 between the side pieces of the yoke, as shown in Fig. 2. At one side of the plate is a curved rib 42, extending into a notch in the side arm 24 of the yoke, serving to hold the parts in operative position, and at the rear edge of the plate is a laterally-extending curved flange 46, provided on its inner face with ratchet-teeth 47, with which coöperates a latch member 48. The latter is movable longitudinally on the yoke in a recess provided in the inner face of the side piece 25, in which it is held by the plate 41, and extending rearwardly and laterally therefrom is a finger-piece 49, projecting into proximity with the handle 33. In assembling the parts of grain-drills slight variations sometimes occur, so that the established distance between the cross-bar 2 and the shaft 6 is altered on different drills, and if these variations do not occur in the manufacture they are liable to be produced by warping, shrinking, or straining of the frame, and in such instances to prevent the plate 41 from binding on the yoke it is pivotally connected at 50 to a support having the ends 51 and 52 adapted to extend over the rear and top faces of the cross-bar 2 and which may be secured thereto by any suitable form of fastening. A duplicate of the yoke and coöperating parts is also employed for driving the seeding mechanism shaft 6, in which event an extra gear-wheel similar to the idler 18 is employed and rigidly connected to said shaft, as will be understood.

The construction of the yoke comprising two separate arms united at each end makes a rigid frame which will not become displaced or injured when subjected to severe use and by extending the forward ends of the arms downwardly, and they may be united beneath the idler or gear wheel 18 without interfering with the driven gear-wheel 17 on the shaft 5 during the vertical adjustment of the yoke. The pivotal connection between the locking-plate and the frame of the machine simplifies the operation of attaching it thereon and also enables the plate to be guided on the yoke and an automatic locking device to be employed in connection therewith.

We claim as our invention—

1. The combination with a driving-shaft, a plurality of gear-wheels thereon, a driven shaft and a gear-wheel thereon, of an intermediate pinion coöperating with the gear-wheel on the driven shaft and one of those on the driving-shaft, a yoke supporting said pinion and flanges on the sides thereof extending into proximity with the driving-shaft and overlapping the sides of the gear-wheel thereon.

2. In a grain-drill comprising a frame and a hopper thereon, the combination with a driven shaft for operating feeding devices located in the hopper and having a gear-wheel thereon, of a driving-shaft, a plurality of differential gear-wheels on the latter and a pinion coöperating with the driving and driven gear-wheels, a pivoted support for the pinion, a locking member movably mounted on the frame for automatic adjustment relative to said support and means for securing the support in adjusted position on the member.

3. In a grain-drill comprising a frame and a hopper thereon, the combination with a driven shaft for operating feeding devices located in the hopper and having a gear-wheel thereon, of a driving-shaft, a plurality of differential gear-wheels on the latter and a pinion coöperating with the driving and driven gear-wheels, a pivoted support for the pinion, a locking member pivoted on the frame for automatic adjustment relative to said support and provided with ratchet-teeth and a latch on the support coöperating with said teeth.

4. In a grain-drill comprising a frame and a hopper thereon, the combination with a driven shaft for operating feeding devices located in the hopper and having a gear-wheel thereon, of a driving-shaft, a plurality of differential gear-wheels thereon and a pinion coöperating with the driving and driven gear-wheels, a pivoted yoke supporting the pinion, a locking member on the frame having a laterally-extending curved flange and a coöperating member movable longitudinally on the yoke and engaging said flange.

5. In a grain-drill comprising a frame and a hopper thereon, the combination with a driven shaft for operating feeding devices located in the hopper and having a gear-wheel thereon, of a driving-shaft, a plurality of differential gear-wheels thereon and a pinion coöperating with the driving and driven gear-wheels, a pivoted yoke supporting the pinion, a locking-segment pivoted on the frame having a laterally-extending flange provided with ratchet-teeth and a latch coöperating with said teeth having a finger-piece in rear of the flange.

6. In a grain-drill comprising a frame and a hopper thereon, the combination with a driven shaft for operating feeding devices located in the hopper and having a gear-wheel thereon, of a driving-shaft, a plurality of differential gear-wheels on the latter and a pinion coöperating with the driving and driven gear-wheels, a pivoted yoke supporting the pinion and having an internal recess, a plate extending through the yoke at one side of the recess having interdental notches thereon and a latch member located in the recess and coöperating with said notches.

7. In a grain-drill comprising a frame and a hopper thereon, the combination with a driven shaft for operating feeding devices located in the hopper and having a gear-wheel thereon, of a driving-shaft, a plurality of differential gear-wheels on the latter and a pinion coöperating with the driving and driven gear-wheels, a pivoted yoke supporting the pinion, a locking-segment, a supporting-piece pivotally connected thereto and adapted to engage the side and top of the frame of the machine, and a latch coöperating with the segment.

8. In a grain-drill the combination with a hopper having compartments for seed and fertilizer, separate shafts for operating feeding mechanism located in each compartment and a driving gear-wheel attached to one of the shafts, an idler intermeshing therewith and journaled on the other shaft and an adjustable arm also journaled on said shaft, of variable-speed-gearing devices, a connecting member carried by the arm and coöperating with said gearing devices and the idler.

9. In a grain-drill, the combination with a hopper having compartments for seed and fertilizer, separate shafts for operating feeding mechanism located in each compartment and a driving gear-wheel attached to one of the shafts, an idler intermeshing therewith and journaled on the other shaft and provided with laterally-extending hubs and a yoke comprising arms journaled on the hubs, of brackets attached to the hopper and engaging the hubs to support the idler, a driving-shaft, variable-speed-gear wheels adjustable thereon and a pinion carried on the yoke and coöperating with said gear-wheels and the idler.

10. In a grain-drill, the combination with a hopper having compartments for seed and fertilizer, separate shafts for operating feeding mechanism located in each compartment and a driving gear-wheel attached to the fertilizer-shaft, an idler meshing therewith and centered on the seed-shaft and provided with laterally-extending hubs and supporting-brackets for the idler connected to the hopper and having ends embracing the fertilizer-shaft and a yoke having arms journaled on said hubs, of a driving-shaft, variable-speed-gear wheels thereon, a pinion carried by the yoke and coöperating with said gear-wheels and the idler.

ALBERT ARMITAGE.
WILLIAM P. THISTLETHWAITE.

Witnesses:
J. L. THISTLETHWAITE,
EMORY D. LAPHAM.